(12) United States Patent
Mueller et al.

(10) Patent No.: US 6,185,413 B1
(45) Date of Patent: *Feb. 6, 2001

(54) MOBILE STATION HAVING A COST-EFFICIENT CALL MANAGEMENT METHOD AND SYSTEM

(75) Inventors: Wilhelm Mueller, Woerth (DE); Neal J. King, Oakland; Michael Sassin, San Jose, both of CA (US)

(73) Assignees: Siemens Aktiengesellschaft, Munich (DE); Siemens Information and Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/877,192

(22) Filed: Jun. 17, 1997

(51) Int. Cl.[7] .................................................. H04Q 7/20
(52) U.S. Cl. ..................................... 455/405; 455/414
(58) Field of Search .................................. 455/405, 414, 455/432, 419; 379/114

(56) References Cited

U.S. PATENT DOCUMENTS

| | | | |
|---|---|---|---|
| 4,989,230 | 1/1991 | Gillig et al. | 379/59 |
| 5,159,625 * | 10/1992 | Zicker | 455/432 |
| 5,173,933 | 12/1992 | Jabs et al. | 379/58 |
| 5,303,297 * | 4/1994 | Hillis | 455/406 |
| 5,325,418 | 6/1994 | McGregor et al. | 379/59 |
| 5,425,085 | 6/1995 | Weinberger et al. | 379/112 |
| 5,577,100 | 11/1996 | McGregor et al. | 379/58 |
| 5,590,397 * | 12/1996 | Kojima | 455/414 |
| 5,594,781 | 1/1997 | Kozdon et al. | 379/60 |
| 5,761,618 * | 6/1998 | Lynch et al. | 455/432 |
| 5,802,502 * | 9/1998 | Gell et al. | 379/114 |

\* cited by examiner

Primary Examiner—Daniel S. Hunter
Assistant Examiner—Myron K. Wyche

(57) ABSTRACT

A mobile station for transmitting a mobile radio signal to a base station has a memory device in which a number of available applications are stored which can relate to different "carriers," i.e., mobile radio network systems or service providers within a single mobile radio network. A selection device of the mobile station calculates expected charges for a desired connection for each of these applications which are being considered for the transmission connection. Based upon the calculations, the most cost-efficient application for the desired transmission is selected. The actual transmission of the communication data for the base station is then carried out on the basis of this application.

12 Claims, 4 Drawing Sheets

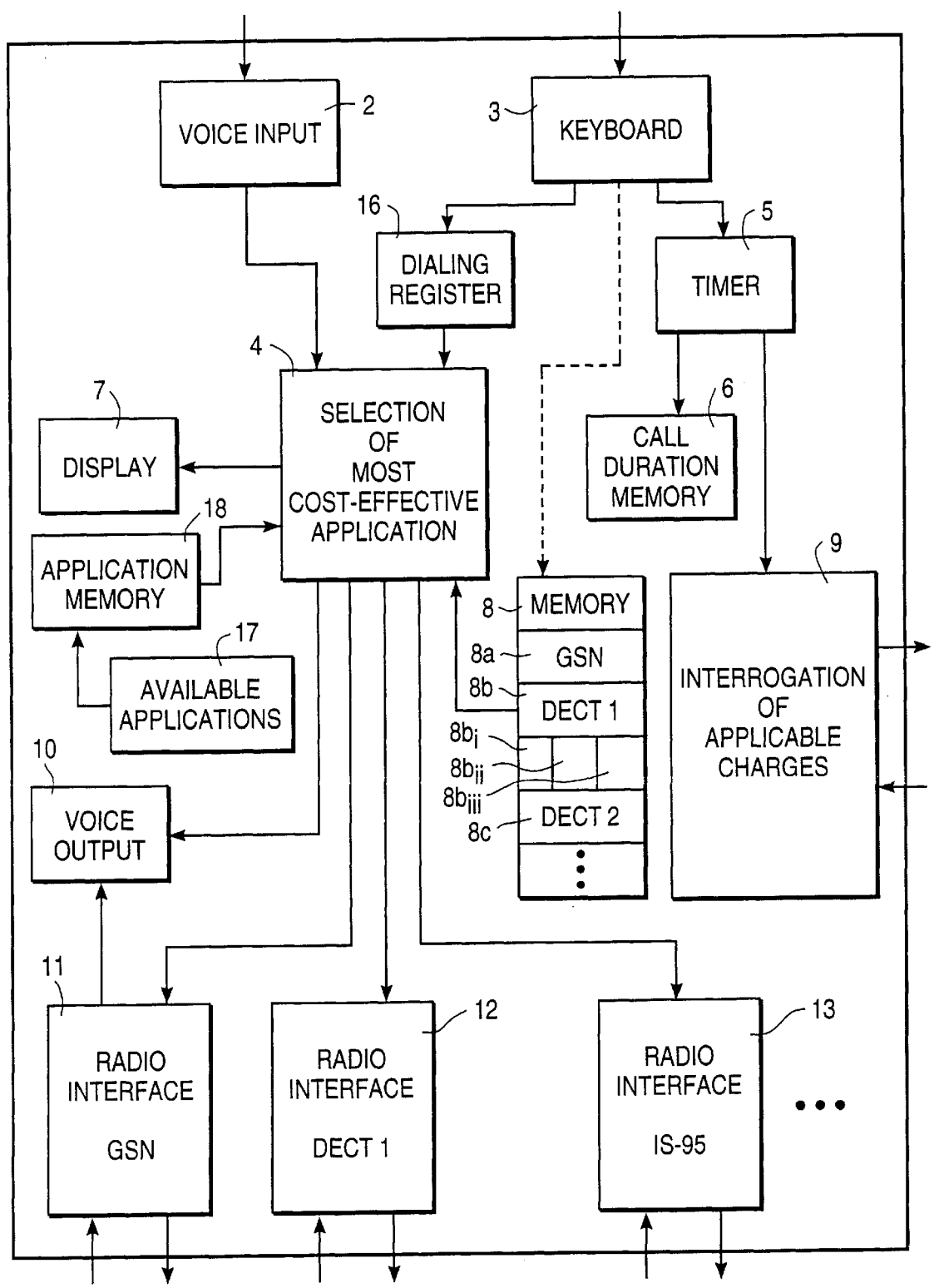
FIG_1

| MOBILE RADIO STANDARD | GSM (D1/D2) | DCS 1800 (E1) | DECT | D-AMPS (IS-54) | IS-95 | JDC (PDC) |
|---|---|---|---|---|---|---|
| FREQUENCY BAND | 890-915 MHz (UL) 935-960 MHz (DL) | 1710-1785 MHz (UL) 1805-1880 MHz (DL) | 1880-1900 MHz | 824-849 MHz (UL) 869-894 MHz (DL) | 800-900 MHz 1850-1990 MHz | 940-960 MHz (UL) 810-830 MHz (DL) |
| CHANNEL SPACING | 200 kHz | 200 kHz | 1,728 MHz | 30 kHz | 123 MHz | 25 kHz |
| CHANNELS PER CARRIER | 8 | 8 | 12 | 3 | 64 | 3 |
| ACCESS METHOD | TDMA | TDMA | TDMA | TDMA | CDMA | TDMA |
| TRANSMISSION METHOD (MODULATION) | GMSK | GMSK | GMSK | $\pi/4$-DQPSK | QPSK | $\pi/4$-DQPSK |

FIG_2

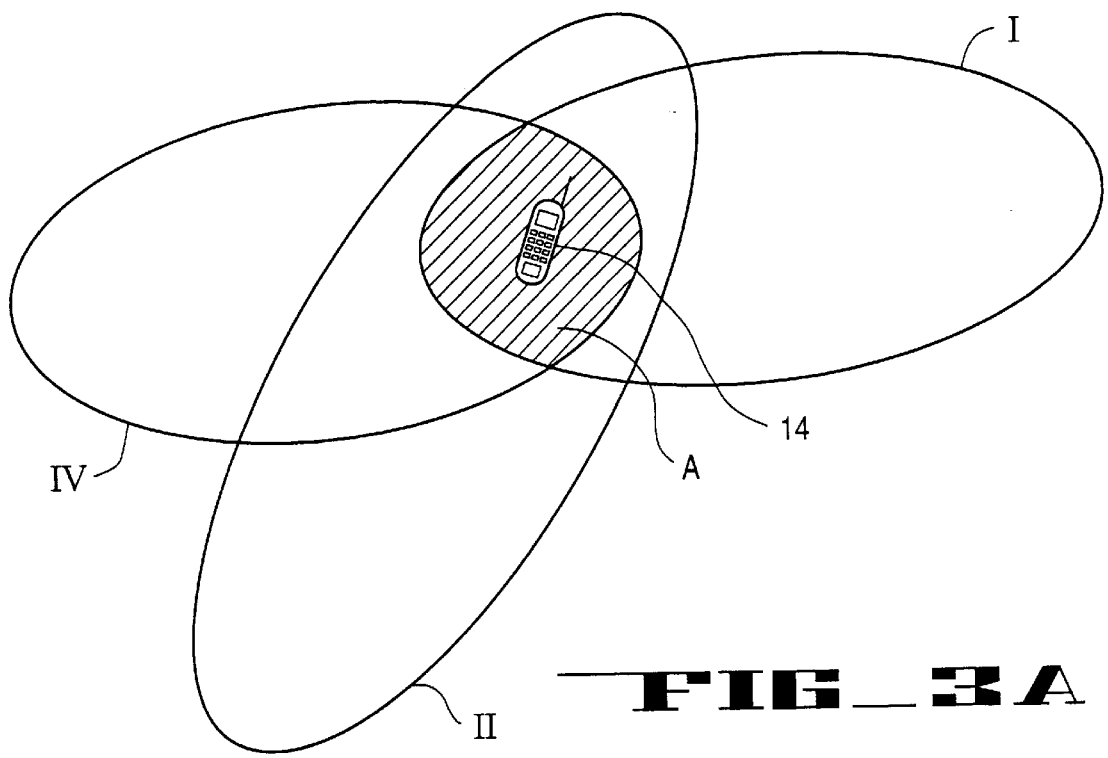
FIG_3A
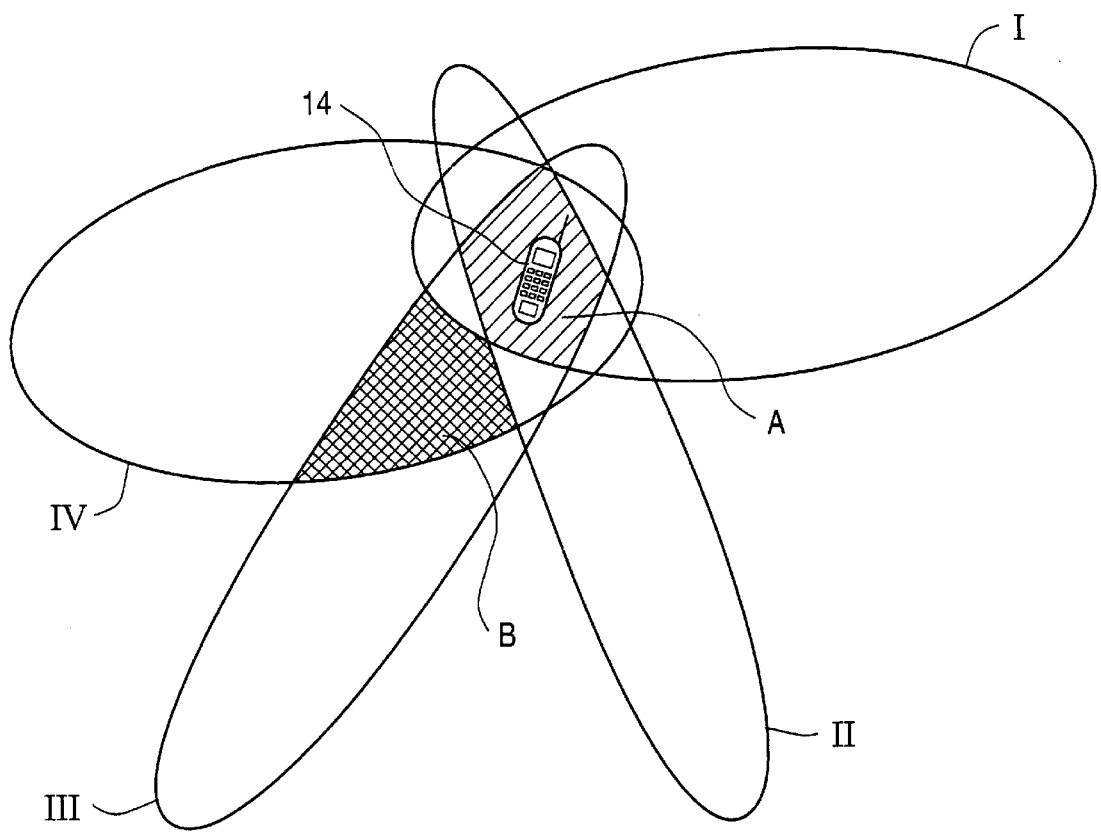
FIG_3B

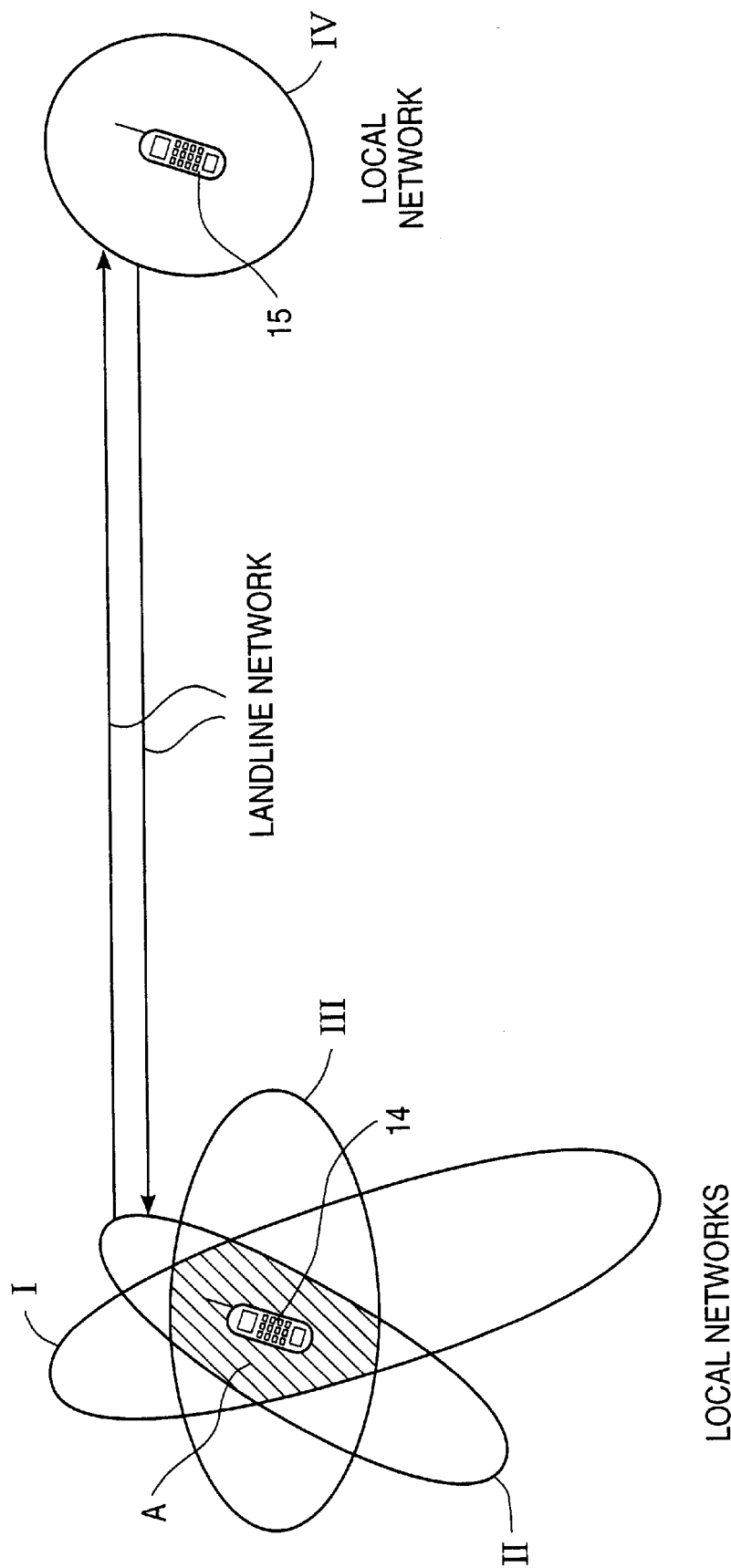
FIG_4

MOBILE STATION HAVING A COST-EFFICIENT CALL MANAGEMENT METHOD AND SYSTEM

BACKGROUND OF THE INVENTION

The present invention relates to a mobile station to be used in mobile radio systems.

DESCRIPTION OF THE RELATED ART

Mobile communication is one of the fastest growing segments of the telecommunications industry. Until the end of the eighties, only some analog radio telephone systems were operated in Europe which essentially work within a frequency band of between 450 and 900 MHz. Because of the lack of a uniform technical standard and because of the rapid technical advances in the field of digital voice coders and digital signal processing, work was started on a uniform pan-European digital system, the GSM (Global System for Mobile Communication), which was taken into operation in western Europe in 1992. In the time following that, other digital mobile radio systems were developed which will be explained in the following paragraphs, referring to FIG. 2.

The GSM was initially taken into operation only in western Europe and was then also successful in many countries outside of western Europe such as, for example, Australia, China, Russia, Singapore, etc. In Germany, the Federal Ministry for Post and Telecommunications issued two licenses for digital GSM networks which were obtained, on the one hand, by DeTeMobil GmbH and, on the other hand, by Mannesmann Mobilfunk. The GSM networks provided by the two operators are two physically separate mobile radio networks having their own transmitting stations. DeTeMobil GmbH operates its GSM network under the name "D1," whilst the GSM network operated by Mannesmann Mobilfunk is known by the name "D2." As can be seen from FIG. 2, digital data transmission in the GSM network takes place from a mobile station which can be, for example, a car telephone, a cordless telephone or a handheld telephone, to the stationary base station in the frequency band between 890 and 915 MHz. This direction of connection is known as the "uplink." The "downlink," i.e. the data transmission from the stationary base station to the mobile station, takes place in the frequency band between 935 and 960 MHz. The carrier frequencies modulated with the digital transmission information have a channel spacing of 200 kHz and it is possible to transmit eight individual channels per carrier frequency.

To make it possible for several subscribers to access a certain frequency spectrum simultaneously, care must be taken to ensure that the signals of the individual subscribers do not interfere with one another. To be able to separate the various subscriber signals from one another, there are in principle three fundamental methods, namely the frequency division multiplex method (FDMA, Frequency Division Multiple Access), the time division multiplex method (TDMA, Time Division Multiple Access) and the code division multiplex method (CDMA, Code Division Multiple Access). In the FDMA method, the frequency axis is subdivided into frequency channels, each subscriber being allocated a separate channel on which the subscriber may transmit without restrictions as long as the transmission remains within the predetermined channel bandwidth. The FDMA method was last used mainly in the analog mobile radio systems. In the TDMA method, the time axis is subdivided instead of the frequency axis, i.e. although each subscriber has access to the entire bandwidth, the subscriber only may transmit at certain times, i.e. in time slots. These slots have a width of, e.g., 0.577 ms in the GSM mobile radio system which, as can be seen from FIG. 2, uses the TDMA method as access method. In the CDMA method, each subscriber can use the entire frequency bandwidth as in the TDMA method but can also transmit over the entire time without having to adhere to certain time slots. To avoid a collision between individual subscriber signals in this case, nevertheless, the individual subscriber signals are separated by using orthogonal codes in the direction of the power axis, i.e. the individual subscriber signals are transmitted at different powers. Apart from these three basic types, combinations of the individual access methods are also conceivable, a combination of TDMA and FDMA being normally used in the GSM mobile radio system.

For the transmission of digital communication information, a large number of different transmission methods are known which are distinguished from one another by the modulation method used in each case. Modulation is generally understood as being the change of a carrier signal depending on the information signal to be transmitted. In principle, the modulation methods involve three possibilities of impressing an information signal (which is present in digital form in digital modulation) on the carrier signal, a distinction being made between amplitude, frequency or phase modulation depending on whether it is the amplitude, the frequency or the phase angle which is changed by the information to be transmitted. A widely used phase modulation method is the GMSK (Gaussian Minimum Shift Keying) method. The GMSK method has the advantages of the MSK (Minimum Shift Keying) method, but the break points occurring in the frequency and phase characteristic of the MSK signal as a result of a widening of the power density spectrum are eliminated in the GMSK method by using a Gaussian low-power variant. Another known phase modulation method is the $\pi/4$ DQPSK (Differential Quadrature Phase Shift Keying) method which is an advantageous variant of the QPSK (Quadrature Phase Shift Keying) method. In the QPSK method, the communication information present as digital signals is divided into bits of even and odd position with the aid of quadrature phase shift keying and then multiplied by the carrier frequency. In this process, dips can occur in the envelope curve of the quadrature phase modulated signal which can lead to adjacent-channel interference. To achieve as constant as possible an envelope curve, the QPSK method was developed further into the $\pi/4$ DQPSK method in which the 180° phase jumps leading to the amplitude dips in the QPSK method are avoided. In addition to these phase modulation methods, a number of other modulation methods are known which, however, will not be discussed in greater detail in the text following.

FIG. 2 shows the characteristics of the GSM mobile radio system. In addition to the D1 and D2 licenses, the Federal Ministry for Post and Telecommunications issued a third mobile radio license which relates to the DCS (Digital Cellular System) 1800 mobile radio system. The DCS 1800 mobile radio system has been operated in Germany since 1994 as the "E1" network. A modified version of the GSM system is called PCS-1900 in the United States.

As a rule, mobile radio systems which are aimed at a large number of subscribers have a cellular structure, i.e. the entire area to be supplied is subdivided into smaller radio zones, "radio cells." The intentional limiting of the radio zones makes it possible to reduce the transmitting power needed for transmitting information so that the transmitting frequencies, which are actually scarce, can be reused at a sufficiently large distance without the individual transmission channels interfering with one another. Two mobile radio subscribers which are far enough apart from one another can use the same frequency channel simultaneously in this manner. Each radio cell is allocated a base station, the receiving range of which is limited to the relevant radio cell. If a mobile station moves out of the service area of its base station, the connection must be conducted via another base station, which is then carried out by an automatic change in radio zone without significantly impairing the quality of the continuing connection. This process is called "handover." In contrast to the cellular systems, the PCS or PCN system comprises individual local networks which, in turn, can be structured as cellular networks. The individual local networks, however, are connected to one another by the landline network. This means that in the case of the PCS or PCN systems the entire area is not covered by radio zones, but mobile radio transmission is only possible within the individual local networks. It was especially for the American PCS systems that the DCS 1800 standard was developed further into the PCS 1900 standard, the frequency band of which is shifted by 100 MHz compared with the DCS 1800 standard.

Another mobile radio system standard shown in FIG. 2 is the American D-AMPS (Digital Advanced Mobile Phone System) standard which is also designated as IS-136 (Interim Standard 136). The frequency information on the Uplink (UL) and the Downlink (DL) and the other technical parameters of the D-AMPS standard are listed in FIG. 2.

Another mobile radio system standard commonly used in the United States is the IS-95 system, the technical data of which are also shown in FIG. 2. The frequency band used in accordance with the IS-95 standard is in the cellular band between 800 and 900 MHz and in the American PCS band between 1850 and 1990 MHz. The IS-95-standard is based on the CDMA access method described above. The modulation method used is the QPSK method. FIG. 2 also shows the Japanese JDC (Japanese Digital Cellular) standard which is also called the PDC (Personal Digital Cellular) standard.

Finally, FIG. 2 shows the DECT (Digital Enhanced Cordless Telecommunications) standard which, however, is not a mobile radio standard in its actual sense but a standard for wireless telephones. DECT does not specify a network for mobile communication, but only defines the radio interface between the base station and the mobile part. The DECT standard is the ideal standard within spatially defined areas such as office or private buildings or residential zones. Due to the relatively short range of the base station (between 30 and 300 m), it is not yet possible to implement a full-coverage DECT network. A significant difference between DECT networks and most of the other mobile radio networks such as, for example, the GSM systems, is that the handover described above is not controlled by the base station but by the mobile station.

In addition to the actual mobile radio network operators, there are some service providers which purchase access to the corresponding mobile radio networks and then offer their services as chargeable services to the ultimate customer.

It follows from the above description that a customer in a certain spatial region is provided with a selection of a large number of different mobile radio network systems and appropriate providers depending on the range of the individual mobile radio networks.

FIG. 3a shows as an example the spatial range of three different mobile radio systems I-III. These can be, for example, a GSM network, a DECT network, a DCS 1800 network, etc. The three mobile radio networks overlap spatially in area A shown shaded. A mobile radio subscriber located in this area A (shown by a handheld telephone 14 in FIG. 3a) thus has a choice between each of these three different mobile radio networks.

FIG. 3b shows an example of the area-coverage of a region by four different mobile radio networks I-IV. In the area of overlap A, the mobile radio subscriber located in this area has a choice between four mobile radio systems, while there would only be a choice between the mobile radio systems III and IV in area B. In this case, too, the mobile radio networks I-IV can be any of the network systems shown in FIG. 2 or other known network systems. However, it is also conceivable that, for example, networks II and III are in each case GSM networks but are offered by different network operators. Thus, for example, the network designated by II could be the D1 network and the network designated by III could be the D2 network. It is also conceivable that the individual networks are different DECT networks, etc.

As already mentioned, a mobile radio network is, as a rule, not offered by only one single network operator. In Germany, there are more than ten service providers which have in each case purchased access to the D1, D2 and E1 networks and offer chargeable mobile radio services. Thus, the customer has not only a choice between different mobile radio systems depending on the range of the individual providers or the individual mobile radio networks, but also between the different service providers within the individual mobile radio systems.

The mobile radio services are offered chargeably both by the actual mobile radio network operators and by the individual service providers. FIG. 4 shows an example of the charges arising in an American PCS system. In this arrangement, a number of local radio networks I-III are connected to another local network IV via a landline network. A mobile radio subscriber 14 located within the transmitting and receiving range of a certain mobile radio network I-III must first set up a connection to the appropriate base station of the mobile radio network selected by the subscriber so that the information to be transmitted is then transmitted from the base station via the landline network to the base station responsible for the local network IV in order to establish the connection between mobile radio subscribers 14 and 15. In this arrangement, caller 14 must pay, on the one hand, the transmission charges (e.g., airtime) for the connection between the mobile station and the base station and, on the other hand, the charges for the transmission via the landline network.

Since the GSM networks in western Europe are configured as full-coverage networks, transmission of the communication information via the landline network is not required so that in this case there is no charge for the landline network transmission.

The transmission and possibly landline network charges for which the customer are billed by the individual mobile radio network operators or service providers can differ markedly from one another. In some applications, it is important to know the charges for use of a wireless phone. U.S. Pat. Nos. 5,577,100 and 5,325,418, both to McGregor et al., describe wireless phones having internal accounting systems. The wireless phones are particularly suitable for rental phone systems and controlled intra-corporate phone systems where a pay-as-you-go process is desirable. A stored complex algorithm provides a multiple factor accounting protocol for decrementing a debit account as the phone is used. When a preselected charge amount is reached, the phone is deactivated. Thus, the rental company or corporate entity that provides the telephone to a user is not at risk of having the user mount up excess charges.

The method and system of McGregor et al. operate well for their intended purpose. However, the method and system are "passive" with respect to the connectivity of the outgoing calls. That is, the internal accounting merely monitors the usage.

A more "active" system is described in U.S. Pat. No. 5,173,933 to Jabs et al. The system is particularly suited for use in a telecommunications system of an ocean-going vessel. Such a vessel may have access to alternative communication media. The patent to Jabs et al. describes providing a hierarchy of the communications media based upon cost. For example, when the vessel is docked, there may be trunk channels connected directly to land telephone lines. A somewhat more expensive communications medium is identified as a cellular connection. A yet more expensive communications medium is a satellite connection. Within the hierarchy, if the wired telephone line is accessible at the start of a call, the land-based line will be utilized. If the trunk channel connected to the land-based line is not available, a determination will be made as to whether the cellular line is available. If not, the satellite connection will be utilized. Thus, the communication carrier having the communications medium or network of least cost is selected. If the routing is to be established using satellite communications, the system selects the coast earth station of least cost based upon location of the ocean-going vessel, the destination of the call, and other rate considerations.

The hierarchical selection of communications media taught in Jabs et al. is centrally located. That is, the selection process occurs in a communications room of the ocean-going vessel, rather than at the location of the callers. Thus, the process is universally implemented and not specific to a caller. Caller-specific implementation and/or phone-specific implementation of the selection process is not available. Instead, a selection of a communications medium is based firstly upon a determination of the availability of the different media and secondly upon the established hierarchy for the media that are available.

U.S. Pat. No. 5,425,085 to Weinberger et al. discloses a device which connects a landline telephone to the correspondingly most cost-efficient telephone provider. However, the device described in this patent specification only relates to the selection of the provider which is most cost-efficient for the transmission via the landline network, i.e. the exchange line. The different charges of the local mobile radio network operators or service providers, respectively, are not taken into consideration. Since U.S. Pat. No. 5,425,085 relates exclusively to landline telephones, the patent also does not take into consideration the inherent problems of mobile stations, namely that the site of the caller can change during a call, which may influence the charges to be made for the connection.

What is needed is a call management method and system that provide flexibility in selecting among a number of different operators and/or service providers available to a portable phone to establish connectivity for outgoing calls.

SUMMARY OF THE INVENTION

A mobile station is provided for selecting among a number of different applications which authorize use of a certain mobile radio network or use of a mobile radio service of a certain service provider. The mobile station according to the invention is supplied with the corresponding charge data for each of these applications, which data are advantageously stored in the mobile station. After selecting a destination number, a selection device provided in the mobile station first decides which of the different applications available, i.e. different mobile radio networks or service providers, can be considered or are available for the desired connection. That is, the selection device considers the different "carriers," i.e. mobile radio networks and service providers. This decision is made on the basis of the current location of the user of the mobile station and the location of the mobile radio subscriber corresponding to the dialed destination number. From the applications concerned, the selection device selects the application (i.e., carrier) which is most cost-efficient for the desired connection. This selection is made by calculating the charges to be expected for each application in question depending on the provided cost data, the transmission link required for the desired transmission and the call duration to be expected. After the most cost-efficient application has been selected, the desired transmission is carried out in accordance with the mobile radio network status corresponding to the selected application.

The charge data stored in the mobile station for each available application can be regularly and automatically updated by the mobile station by calling a central information station with the aid of a mobile radio signal. The period of such a polling of the valid charge rates is advantageously selected in such a manner that changes in charges to be expected can always reliably be detected.

If the actual call duration exceeds the expected call duration or the position of the caller changes, this can influence the charges to be made. For this purpose, it is proposed according to the invention to determine the actual costs for each available application continuously depending on the actual call duration and the actual location of the caller and to compare them continuously so that, if necessary, appropriate information can be displayed when another mobile radio network operator or service provider can be considered as a cheaper application.

BRIEF DESCRIPTION OF THE DRAWINGS

FIG. 1 shows an illustrative embodiment of the mobile station according to the invention.

FIG. 2 shows a listing of the technical parameters of known mobile radio network systems.

FIGS. 3 and 4 show representations for explaining the object forming the basis of the invention.

DETAILED DESCRIPTION

With reference to FIG. 1, a mobile station 1 according to the invention includes a voice input device 2, such as a microphone, a keyboard 3 for inputting or selecting previously stored telephone numbers, a display 7 for displaying selected or entered telephone numbers and for displaying operational messages of the mobile station, and a voice output device 10, which is formed by a loudspeaker for the audible reproduction of received communication data or operational status messages of the mobile station.

The mobile station 1 is capable of processing at least two different applications of a user. That is, more than one carrier is available for establishing connectivity for outgoing calls. For this purpose, the mobile station 1 has a memory 8 which stores various applications 8a–8c of the user. Each of the applications corresponds to an authorization of the user which allows him to operate the mobile radio network belonging to the application or to use the service provider belonging to the application. As a rule, a user obtains the authorization for use by concluding a contract with the relevant mobile radio network operator or service provider (i.e., carrier). After a user has obtained access authorization, each user is allocated "authentication data" which unambiguously identify the mobile radio subscriber. These authentication data are interrogated and checked each time a connection is set up via the base station which corresponds to the communication standard or mobile radio standard of the corresponding application, in order to be able to effectively avoid accounting errors due to false identities and attacks by masquerading by means of a pretended identity.

The mobile station 1 in FIG. 1 operates as follows: The mobile radio subscriber initially dials the call number of a desired destination set via the keyboard 3. This call number is stored in a dialing register 16 from where it is supplied to a selection device 4 which determines the most cost-efficient mobile radio network operator or service provider within the individual mobile radio networks available for the desired transmission connection.

The destination call number dialed by the mobile radio subscriber also contains the appropriate preselection code or local area code, so that the selection device 4 can draw conclusions regarding the location of the destination set by means of the dialed telephone number. To be able to determine the most cost-efficient provider for the desired transmission connection, it is firstly necessary to be able to unambiguously determine the transmission link leading from the mobile station to the destination set. For this purpose, it is necessary to determine, in addition to the location of the destination set, the service provider which is accessible at the location of the mobile station 1. This is done by means of the procedures defined in the appropriate radio standards, with the aid of a device 17 which determines the applications, i.e. the network operator and/or service provider, available at the location of the mobile radio subscriber and stores them in a memory 18.

After the determination of the mobile radio networks or service providers to be considered for the desired transmission connection, and of the destination set corresponding to the dialed call number, the selection device 4 determines the most cost-efficient mobile radio network operator or service provider for the desired transmission connection. Thus, there are two levels in the selection of the most cost-efficient provider. Since, however, the charges for the mobile radio network and possibly the landline network (compare FIG. 4) to be expected for the transmission connection are dependent on the transmission time, i.e. the call duration, the selection device 4 must also base the determination of the most cost-efficient provider on a predetermined call duration value. For this purpose, a standard or default value, e.g., five minutes, which is routinely used as a basis for the determination by the selection device 4, can be stored in a call duration memory 6. As an alternative, the caller can inform the selection device 4 of the call duration to be expected via the keyboard 3. It is also conceivable that the call duration memory 6 continues to learn on the basis of the calls last made and continuously updates its contents in that it always stores the current mean value of the call durations of, for example, the last five calls as a default value for the call duration. Naturally, the mean value can also be determined from a larger or smaller number of past calls.

Once the selection device 4 has determined the location of the mobile station 1, the location of the destination set, the applications of the memory 8 which are to be considered for the desired transmission connection, and the call duration to be expected, the selection device 4 also needs information on the charge rates applicable to the individual applications in order to be able to actually determine the most cost-efficient provider for the desired transmission connection. These charge rates are usually dependent both on the day of the week and the time of day. It is, therefore, necessary that the selection device 4 be supplied with extensive charge information on the applications to be considered for the transmission connection, i.e. for the mobile radio networks or service providers within the mobile radio networks to be considered. The corresponding charge information is advantageously stored together with the application data for each application in the memory 8. However, it is also conceivable that the selection device 4 is informed about the charge information via keyboard 3 (which, however, is relatively complex) or via an exchangeable chipcard which contains the charge rates applicable in each case for all mobile radio networks or service providers within the mobile radio networks, before the mobile station is taken into use. If the mobile radio networks being considered for the desired transmission connection are not full-coverage networks, so that the interposition of the landline network becomes necessary for the transmission connection (compare FIG. 4), the selection device 4 must be informed in a similar manner about the applicable charge rates of the landline network operator or operators.

On the basis of this aforementioned information, the most cost-efficient mobile radio network or service provider within the mobile radio networks for the desired transmission connection can now be selected by the selection device 4. The selected carrier is then employed to establish connectivity for the desired outgoing call.

The memory 8 of the mobile station 1 according to the invention comprises at least two different applications. These applications can be, on the one hand, registrations relating to different mobile radio networks, for example the GSM network, the DCS 1800 network, the D-AMPS network, etc. In this connection, all available mobile radio networks or mobile radio standards and especially the mobile radio standards shown in FIG. 2 can be included. On the other hand, the applications can also relate to different applications within the same mobile radio standard; for since there are several service providers within a mobile radio network, i.e. firms which have purchased access to the relevant mobile radio network and then offer the mobile radio services to the ultimate customer, it is also possible to have different applications within the same mobile radio network, i.e. the different applications can relate to different service providers. Thus, for example, one application can relate to the D1 network and one application to the D2 network within the GSM mobile radio network. It is also conceivable that the different applications concern the same mobile radio network and the same service provider but only relate to different access authorizations. Thus, for example, it is possible for different contracts for different call numbers of the mobile station to be negotiated with a certain service provider and for different charge rates to be applied for the different contracts. It is especially the DECT GAP (Digital Enhanced Cordless Telecommunications-Generic Access Profile) standard which allows at least two applications according to the DECT standard for each set, where one application can relate, for example, to the private connection, one to the office connection, and one application to the connection used in public. The above description shows that the term "application" in the present invention must be interpreted in its most general meaning and in each case designates an individual access authorization to a mobile radio network or a service provider within a mobile radio network.

In the illustrative embodiment in FIG. 1, the memory comprises three different applications 8a–8c, application 8a designating an access authorization to a GSM mobile radio network, application 8b designating an access authorization to a first DECT mobile radio network, and application 8c designating an access authorization to a second DECT mobile radio network. However, further applications which relate to other mobile radio standards or different service providers can be provided in the memory 8. In the U.S., in particular, applications relating to the D-AMPS or IS-95 mobile radio standards can be stored in the memory 8.

The application 8b shown in FIG. 1 which relates to the first DECT mobile radio network is subdivided into three subcodes $8b_i$–$8b_{iii}$. As already described above, these subcodes or subapplications relate to different access authorizations within the DECT 1 network which can relate, for example, to a private connection, an office connection, or a connection of the mobile radio subscriber used in public. In this case, it may be necessary to correct the destination call number dialed by the user. This is because, if the (sub-) application selected as the most cost-efficient application relates to a connection via a subsidiary private branch exchange (PBX), the selection device 4 must extend the dialed call number by the exchange code, such as a "9." This exchange code enables an outside call from the subsidiary branch exchange, since this exchange code has not been dialed by the user originally.

For each application or subapplication stored in the memory 8, the charge rates applicable to the respective application or a subapplication are also stored in the memory 8. In this manner, the selection device 4, after finding the location of the mobile station 1, the location of the destination set, the applications to be considered for the desired transmission connection and the call duration to be expected, can select the provider most cost-efficient for the desired transmission connection, i.e. the most cost-efficient application or subapplication. In this connection, the selection is done on the basis of the connection charges to be expected for the transmission connection which comprises, in particular, the transmission charges for the corresponding mobile radio network and, if necessary, the transmission charges for the landline network (compare FIG. 4).

After the most cost-efficient application has been determined, the selection device 4 activates the transmitting and receiving unit provided for this mobile radio standard depending on the mobile radio standard corresponding to the selected application. In the illustrative embodiment shown in FIG. 1, transmitting and receiving units 11 and 12 representing the radio interface exist for the mobile radio standards GSM and DECT in accordance with the applications 8a–8c stored in the memory 8. If the mobile station 1 is also to be used for transmitting communication data according to other mobile radio standards, additional transmitting and receiving units must be correspondingly provided. Thus, for example, a corresponding radio interface 13 is additionally provided for the IS-95 standard in FIG. 1 so that applications relating to this mobile radio standard can also be processed. By activating the radio interface corresponding to the selected application, the communication data input via the voice input device 2 are forwarded via the selection device 4 to the appropriate radio interface and is there coded and modulated in accordance with the technical data of the corresponding mobile radio standard (compare FIG. 2) and transmitted to an appropriate base station. After the connection with the base station has been set up, the communication data sent by the base station are received in a similar manner by the corresponding radio interface, decoded, demodulated and output via the voice output device 10.

Since the charge rates of the individual mobile radio network operators or service providers change from time to time, it is desirable to provide the selection device 4 with the applicable charge rates in each case for the individual applications stored in the memory 8. For this purpose, a manual mechanism may be provided to change the charge data stored in the memory 8 via keyboard 3. However, it is simpler to provide a receiving unit 9 which is activated by an internal timer 5, such as an oscillator, and sets up a connection at regular intervals. This connection need not be apparent to the user. The connection is to a central information station, whereupon the information station transmits the current charge data for each carrier by radio to the receiving unit 9. Thus, the receiving unit 9 can store the charge data valid for the applications. However, it is also conceivable to construct the receiving unit 9, for example, as a serial interface to which a modem can be connected in order to interrogate the respective applicable charge rates of the individual mobile radio networks or service providers via an on-line connection and to store them in the memory 8.

To make the mobile station 1 accessible to various mobile radio subscribers, i.e. different users, the entire memory 8 which comprises the individual applications and the corresponding charge data for the individual applications can be provided as an interchangeable unit, for example, as a chipcard. Thus, each user can operate the mobile station 1 in accordance with the application and charge data applicable to him by simply inserting the chipcard.

During a call it can occur that the call costs change due to a change in location of the mobile station 1, and/or the initially assumed call duration being exceeded, and/or the passage from a peak-traffic rate to an off-peak rate. In such a manner that due to the current location of the mobile station 1, and/or the current call duration, and/or the traffic-related charge, another available mobile radio network or other service provider is more cost-efficient than the mobile radio network operator or service provider corresponding to the application selected by the selection device 4. It is, therefore, proposed according to the invention that the device 17 continuously determines the applications available at the location of the mobile radio subscriber and stores these in the memory. Moreover, the selection device 4 continuously monitors the current call duration via the call duration memory 6 and the internal timer 5 and the location of the mobile station via the individual radio interfaces 11–13 by sending a corresponding interrogation signal. Furthermore, the selection device tracks the traffic-related differences in charges for the different applications. In each case, the selection device calculates the current charges for the instantaneous transmission connection and instantaneous call duration for the individual applications stored in the memory 8. If one of the applications selected in the memory 8 and accessible at the current location becomes cheaper than the application selected when the mobile station 1 was taken into operation, the selection device 4 outputs a corresponding warning signal via the display device 7 and/or the voice output device 10. The user can then confirm via keyboard 3 that the user wishes to change the application. In this case, the selection device 4 initiates a so-called "transfer call." This means that an inquiry signal is sent via a radio interface which corresponds to the new most cost-efficient application to a corresponding base station of the mobile radio network corresponding to the new application to the same station for taking over the call. After an acknowledgment has been provided by this base station, the connection can be set up via the new radio interface. The old transmission connection is interrupted, i.e. the radio interface corresponding to the old selected application is deactivated by the selection device 4, before the new connection is made. If base stations of the mobile radio network corresponding to the old application and of the mobile radio network corresponding to the new most cost-efficient application are connected to one another by a high-speed datalink, the transmission can also be transmitted directly between the base stations, for example by using the TIA IS-41 protocol. This avoids the situation in which two of the transmitting and receiving units 11–13 of the mobile station 1 must be active for a short time and it is possible to switch over directly from one transmitting and receiving unit to the other transmitting and receiving unit in the mobile station 1.

As an alternative to deactivating the originally selected application prior to forming a connection to a now more cost-efficient application, the change in applications may be implemented using a "conference call approach." In this approach, the connection to the original application is dropped only after the replacement application (i.e., more cost-efficient application) is established. This approach is more expensive than the "transfer call" approach, but it may be more reliable in some circumstances.

In conclusion, it should be pointed out that it is also possible to display all applications being considered for the desired transmission connection and stored in the memory 8 via the display device 7, if necessary with the associated charge data so that the user of the mobile station can manually select the mobile radio network operator or service provider which is personally considered most appropriate.

What is claimed is:

1. A mobile station for transmitting communication data to a base station in accordance with at least one communication standard comprising:

memory means for storing charge data which correspond to at least two different applications, each application authorizing a user of the mobile station to transmit the communication data in accordance with the communication standard corresponding to the application with the aid of the mobile station;

a selection device for selecting a most cost-efficient application for a certain transmission connection depending on the charge data provided for each application and on the basis of a predetermined transmission duration to be expected, and at least one transmitting and receiving unit for transmitting the communication data in accordance with the most cost-efficient application selected by the selection device such that, after a destination code corresponding to the certain transmission connection has been entered and the most cost-effective application for the certain transmission connection has been selected, the entered destination code is correctable depending on the selected application when the selected application relates to a private branch exchange, in order to be able to carry out the transmission from the private branch exchange to the external base station.

2. The mobile station as recited in claim 1 wherein said mobile station is provided for transmitting the communication data according to at least two different communication standards, wherein each communication standard has a dedicated transmitting and receiving unit.

3. The mobile station as recited in claim 2 wherein said charge data stored in the memory means corresponds to at least two different service providers.

4. The mobile station as recited in claim 1 wherein said memory means in removable and interchangeable.

5. The mobile station as recited in claim 1 wherein said mobile station further comprises a receiving means for receiving the externally provided charge data for the individual applications stored in the memory means and for storing the received charge data in the memory means.

6. A method of selecting among a plurality of applications available to a mobile phone for establishing connectivity for outgoing calls comprising the steps of:

storing charge data in memory at said mobile phone such that said memory includes charge information for each of said applications;

receiving input of first call information at said mobile phone, said first call information being indicative of a first outgoing call to a destination phone;

accessing said charge data within said memory to determine costs relevant to utilizing said applications to establish connectivity for said first outgoing call;

selecting one of said applications based upon cost-efficiency in conducting said first outgoing call;

correcting, if necessary, the first call information in order to be able to carry out the transmission from a private branch exchange;

initiating said first outgoing call to said destination phone via said selected application.

7. The method as recited in claim 6 wherein said step of receiving input further comprises receiving identification of a phone number of a remote site that is to be called.

8. The method as recited in claim 7 wherein said step of initiating said first outgoing call further comprises forwarding said identification of said phone number to a service provider uniquely associated with said selected application.

9. The method as recited in claim 6 wherein said step of selecting one of said applications further comprises utilizing an estimate of a duration of said first outgoing call as a criterion for said selection based on cost-efficiency.

10. The method as recited in claim 6 wherein said step of selecting one of said applications further comprises utilizing distance between a base station serving said mobile phone and said destination phone as a criterion for said selection based on cost-efficiency.

11. The method as recited in claim 6 wherein said step of storing charge data further comprises storing charge information specific to a location of said mobile phone and to costs of conducting all sessions from said location via each of said applications.

12. The method as recited in claim 6 wherein said method further comprises the step of updating said charge data periodically by wireless reception of said charge data.

* * * * *